(12) United States Patent
Zimmerman et al.

(10) Patent No.: US 6,284,132 B1
(45) Date of Patent: Sep. 4, 2001

(54) BRINE FILL APPARATUS FOR WATER SOFTENER

(75) Inventors: Jeffrey A. Zimmerman, Forest Lake; Ralph H. Larson, Bayport; Paul C. Myhre, Woodbury, all of MN (US)

(73) Assignee: Ecowater Systems, Inc., Woodbury, MN (US)

( * ) Notice: Subject to any disclaimer, the term of this patent is extended or adjusted under 35 U.S.C. 154(b) by 0 days.

(21) Appl. No.: 09/016,203

(22) Filed: Jan. 30, 1998

(51) Int. Cl.$^7$ ........................................ B01J 49/00
(52) U.S. Cl. ............................. 210/149; 210/191
(58) Field of Search ........................... 210/662, 670, 210/687, 742, 149, 190, 191

(56) References Cited

U.S. PATENT DOCUMENTS

| | | | |
|---|---|---|---|
| 4,207,397 | 6/1980 | Davis et al. | 521/26 |
| 4,722,797 | 2/1988 | Gauer et al. | 210/662 |
| 4,970,003 | * 11/1990 | Rak | 210/742 |
| 5,232,953 | * 8/1993 | Johnson | 210/670 |
| 5,234,601 | * 8/1993 | Janke et al. | 210/662 |
| 5,405,503 | 4/1995 | Simpson et al. | 210/687 |
| 5,411,717 | 5/1995 | Peddicord et al. | 210/190 |
| 5,427,682 | 6/1995 | Vogel et al. | 210/257.2 |
| 5,443,739 | 8/1995 | Vogel et al. | 210/652 |
| 5,501,742 | 3/1996 | Fernholz | 134/25.2 |
| 5,544,072 | 8/1996 | Zimmerman et al. | 210/143 |
| 5,587,089 | 12/1996 | Vogel et al. | 210/164 |
| 5,597,487 | 1/1997 | Vogel et al. | 210/652 |
| 5,624,535 | * 4/1997 | Tsuchikawa et al. | 204/228.2 |
| 5,643,541 | 7/1997 | Peddicord et al. | 210/190 |

OTHER PUBLICATIONS

L. Cole, "Research Report KCI Versus NaCl As a Regenerant for Water Softeners", Water Quality Association Annual Convention, Long Beach, California, Mar. 13–17, 1991, 7 pp.

Sears, Roebuck and Co., "Kenmore Water Softeners Model Nos. 625.3485400, 625.3485500", Owners Manual #7137573, 4/94, pp. 1–32.

* cited by examiner

*Primary Examiner*—Ivars Cintins
(74) *Attorney, Agent, or Firm*—Piper Marbury Rudnick & Wolfe

(57) ABSTRACT

A water softener and a method of operating the same are provided to allow for the efficient use of either NaCl or KCl as the regenerant salt. A user interface is provided to allow the user to indicate to the computer controlling the water softener whether NaCl or KCl is being used. The computer controller adjusts the fill time and brine time, depending on the type of regenerant salt used and on the temperature of the brine.

8 Claims, 2 Drawing Sheets

BRINE FILL APPARATUS FOR WATER SOFTENER

BACKGROUND OF THE INVENTION

1. Field of the Invention

The present invention relates to the art of water softening systems. More particularly, the present invention is directed to a method and apparatus for the efficient use of potassium chloride as the regenerant in a water softener.

2. Description of Related Art

A number of different methods and systems are known in the art for softening water. The water softening process involves the replacement of "hard" ions, such as calcium and magnesium, with "soft" ions such as sodium and potassium. Soft water is often desirable because it is less likely to leave deposits on plumbing fixtures.

Water softeners typically utilize an ion exchange material, typically present as a resin bed, to soften water. In the water softening process untreated water is brought into contact with the resin bed where "hard" ions are exchanged for "soft" ions to provide a source of softened water. After prolonged contact with untreated water, however, the capacity of the resin bed to soften water becomes exhausted. When this occurs, the resin bed may be regenerated by exposing it to a brine solution containing the desired "soft" ions, which process restores its water softening capacity.

The brine needed for regeneration may be formed by dissolving in a quantity of water a regenerant salt having the desired "soft" ions. Typical regenerant salts are sodium chloride and potassium chloride. The type of regenerant salt used determines what type of "soft" ions will be present in the softened water. In particular, sodium chloride results in sodium ions being introduced into the softened water, and potassium chloride results in potassium ions being introduced into the softened water.

Many water softeners regenerate the resin bed automatically. In such systems the resin bed is in service most of the time softening water. When the water softener system determines that regeneration is required, it stops softening water and instead regenerates the resin by exposing it to the brine. A number of different methods are known for automatically determining when to initiate a regeneration. Some of these methods are described in U.S. Pat. Nos. 5,544,072 and 4,722,797, which are incorporated herein by reference. Typically, in such methods, regenerations are performed before the resin bed is completely exhausted, in order to ensure that the user does not run out of soft water.

In addition to determining when to regenerate, many systems automatically select the amount of regenerant to be used in a regeneration step. The regenerant is often provided in the form of dry regenerant salt located in a vessel separate from the resin bed, termed the "brine tank." A measured amount of water is introduced into the brine tank in order to dissolve the desired amount of regenerant, forming a brine. Typically, the rate at which water enters the brine tank, the "fill rate," is fixed, so that the fill time determines the amount of water introduced and therefore the amount of regenerant salt dissolved. The brine is then transferred from the brine tank to the resin bed, so that the resin bed is exposed to a known amount of regenerant during the regeneration process. The used brine is then disposed of as waste.

Sodium chloride (NaCl) has been the regenerant salt most commonly used in water softeners. However, the use of potassium chloride KCl) as the regenerant is an attractive alternative. The potassium ions added to soft water from softeners regenerated with KCl are more beneficial to human health as well as to plant life than the sodium ions added to soft water from softeners regenerated with NaCl. The use of KCl as the regenerant also often results in less chloride being present in the waste brine, making its disposal less environmentally damaging.

Most water softeners, however, are designed for NaCl regenerant and lack the flexibility to operate adequately if KCl is used as the regenerant instead. In particular, if KCl is used as the regenerant, the resin bed may become exhausted prematurely, i.e., before it is regenerated. As a result, the user would run out of soft water. The problem becomes more acute as a function of water temperature and softener efficiency, i.e., the colder the water is that is used to form the brine and the more efficiently the water softener uses regenerant salt, the more likely premature exhaustion is.

Moreover, the use of KCl as the regenerant is more complicated than the use of NaCl for a number of reasons. First, in certain operational regimes, namely, when the resin bed is used most efficiently, the resin bed requires a greater amount of KCl than NaCl for regeneration. Second, the solubility of KCl in water is highly temperature dependent, unlike NaCl. In particular, the solubility of KCl in cold water is greatly reduced relative to NaCl. As a result, when cold water is used to form the brine, a greater amount of water is required to dissolve the KCl. Third, the dissolution of KCl in water is significantly endothermic, so that the KCl cools the water as it dissolves, thereby lowering its solubility even more. Finally, KCl dissolves in water at a slower rate than NaCl.

U.S. Pat. Nos. 5,544,072 and 4,722,797 each disclose a method and apparatus for operating a water softener. These references also disclose that either potassium chloride or sodium chloride may be used as the regenerant, but they do not suggest any changes to the water softening method or apparatus depending on whether NaCl or KCl is used. Such changes are required, however, because of the different characteristics of these two salt types. As a practical matter, then, water softeners in accordance with these references do not have the flexibility to be able to use either NaCl or KCl at the option of the user. Moreover, these references do not disclose any way of accounting for the more complicated characteristics of KCl, such as its temperature dependent solubility, in order to use KCl as a regenerant in an efficient and reliable manner.

SUMMARY OF THE INVENTION

The principal object of the present invention is to provide a water softener and a method of operating the same to allow for the efficient and reliable use of KCl as the regenerant salt.

Another object of the present invention is to provide a water softener method and apparatus having the flexibility to allow either NaCl or KCl to be used as the regenerant salt at option of the user.

Yet another object of the present invention is to provide a method and apparatus for filling the brine tank of a water softener to account for changes in the brine temperature occurring during the course of the fill and thereby to ensure that the required amount of regenerant salt is dissolved.

In accordance with the present invention, a water softener and a method of operating the same are provided to allow for the efficient and reliable use of either NaCl or KCl as the regenerant salt. A user interface is provided to allow the user to indicate to the computer controlling the water softener whether NaCl or KCl is being used. The computer controller adjusts the fill time and brine time depending on the type of regenerant salt used. The temperature of the brine is measured at regular intervals as water is being supplied to the brine tank to dissolve the KCl. At each interval the computer calculates the amount of water needed to dissolve the required amount of KCl, and the fill ends when the amount of water added is approximately equal to the required amount calculated at the most recent time interval.

DESCRIPTION OF THE PREFERRED EMBODIMENT

Water hardness is typically expressed in terms of grains per gallon, which represents the weight in grains of calcium carbonate ($CaCO_3$) which would be needed to be dissolved in one gallon of water to achieve that level of hardness. The capacity of a resin bed, which represents the amount of water of a given hardness it can soften before becoming exhausted, is therefore expressed in grains as follows:

$$C = H \times V$$

where C=capacity of the resin bed in grains, H=the hardness of the water in grains per gallon, and V=the amount of water in gallons at that hardness that can be treated by the resin bed before exhausting it.

When the resin bed becomes exhausted, it may be regenerated by exposing it to a brine comprising a quantity of regenerant salt dissolved in water. The salt dosage, dissolved in water as a brine, required to regain the desired capacity depends on the efficiency of the resin bed. The efficiency, E, of a resin bed is defined as follows:

$$E = C/D$$

where D=the dosage of regenerant salt applied to the resin bed in pounds, and C=the capacity of the resin in grains resulting from that salt dosage.

The water softening process, to the extent that it involves the removal of calcium ions, involves the exchange of either two $Na^+$ ions or two $K^+$ ions for one $Ca^{2+}$ ion. Since the molecular weights of $CaCO_3$, KCl, and NaCl are 100.09, 74.56, and 58.44, respectively, and since 1 pound=7000 grains, the theoretical efficiency is 5995 grains/lb. when NaCl is used and 4699 grains/lb. when KCl is used. Theory thus predicts that NaCl is 28% more efficient as a regenerant salt than KCl, with the result that more KCl would be required for regeneration in order to achieve the same capacity.

In practice, however, resin beds approach their theoretical efficiencies only when low salt dosages are used. The reason for this is that the capacity cannot be increased without limit by increasing the salt dosage. With higher salt dosages, the resulting capacity levels off and gradually approaches a limiting value. Put another way, as the salt dosage is increased, the efficiency falls increasingly below its theoretical value. Moreover, it has been found that for sufficiently high salt dosages, the amount of NaCl and KCl needed to achieve the same capacity becomes essentially the same.

Figure 1:
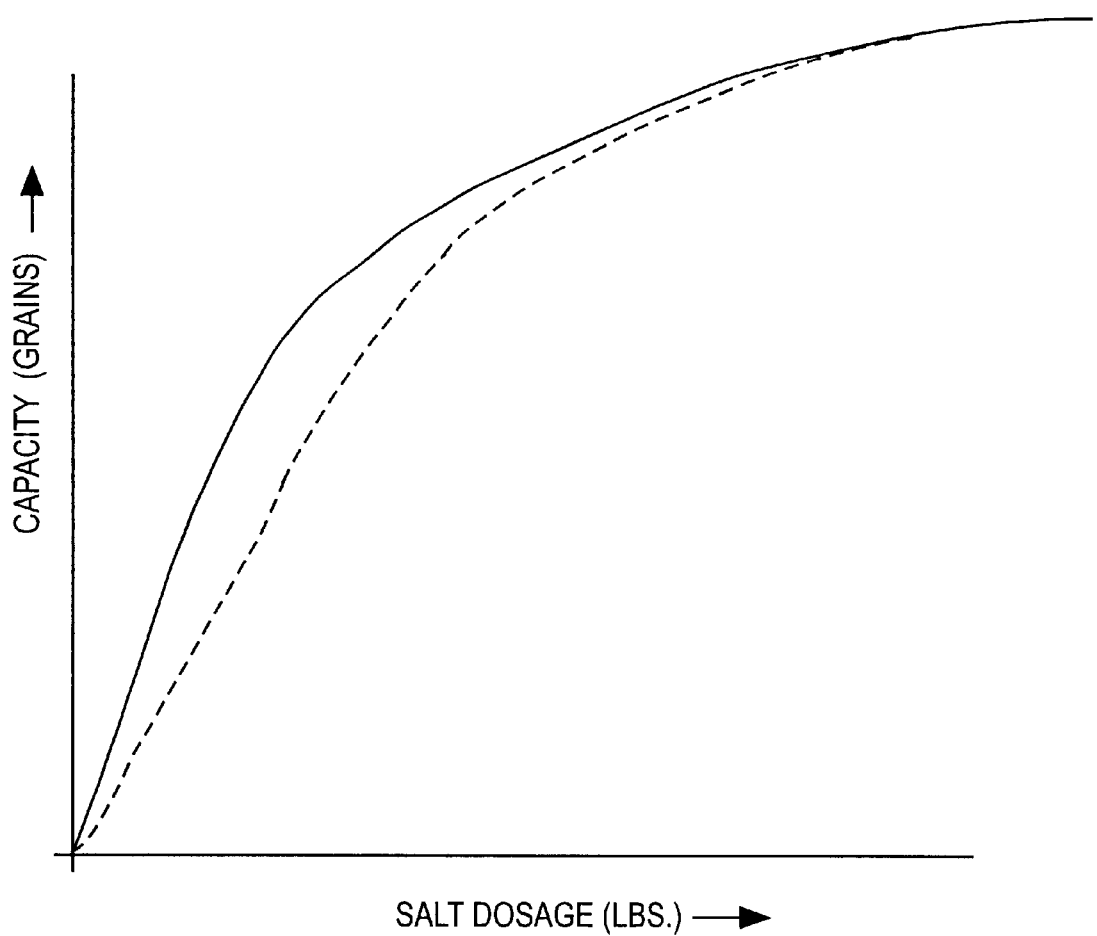
FIG. 1 is a graph which illustrates curves representing the capacity of a typical resin bed as a function of the salt dosage used to regenerate it. The solid line corresponds to the use of NaCl as the regenerant, and the dotted line corresponds to the use of KCl.

This general trend is illustrated schematically in FIG. 1, which is a graph of the capacity of a typical resin bed in grains as a function of NaCl and KCl dosage in pounds. The NaCl curve is a solid line, and the KCl curve is a dotted line. As shown in that graph, when low salt dosages are used, NaCl results in a greater capacity than the same dosage of KCl. However, with higher salt dosages the resulting capacity becomes nearly independent of the type of salt used.

Many water softeners operate in the regime where NaCl and KCl have nearly the same efficiency. However, a more efficient use of regenerant salt is obtained by using lower salt dosages, albeit at the cost of more frequent regeneration. In this regime, then, the lower efficiency of KCl, as compared to NaCl, must be compensated for by increasing the KCl dosage during regeneration.

Preferably, curves for KCl and NaCl like those in FIG. 1 are generated for each resin bed to determine the salt dosage required to achieve the desired capacities. Such data is typically obtained by exhausting the resin bed until the effluent water has a hardness of one grain per gallon. The resin bed is then regenerated with a regenerant brine having a selected salt dosage. Water of a known hardness is passed through the resin bed until the effluent water reaches a hardness of one grain per gallon. The amount of water that has passed through the resin bed is measured, and from this quantity the capacity of the resin bed may be calculated. This procedure is then repeated for various salt dosages to generate the curve of capacity versus salt dosage as in FIG. 1.

Figure 2:
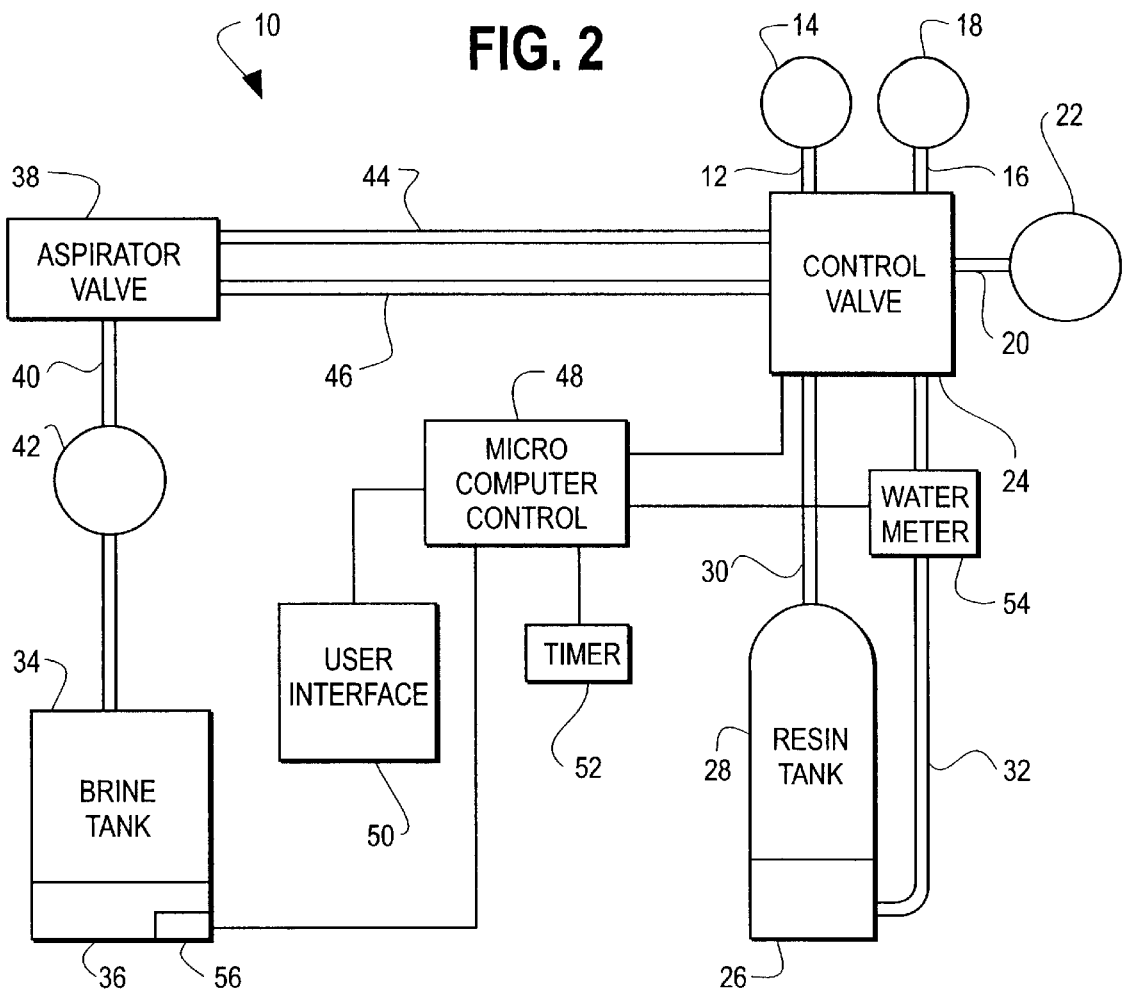
FIG. 2 is a schematic representation of an automatic water softener in accordance with the present invention.

An automatic water softener 10 adapted to use potassium chloride in accordance with the present invention is shown schematically in FIG. 2. When water softener 10 is "in service" it is designed to treat hard water to provide a source of soft water. Periodically, water softener 10 automatically goes out of service, thereby ceasing the softening of water, and enters a "regeneration cycle" designed to regenerate its capability to soften water.

With reference to FIG. 2, water softener 10 preferably includes a source pipe 12, connected to a source of hard water 14, a destination pipe 16, connected to a destination 18 intended to use the softened water, and a drain pipe 20 connected to a drain 22. Pipes 12, 16, and 20 are also connected to a control valve 24. A resin bed 26, preferably comprising particles of ion exchange resin, is disposed in a resin tank 28. A pipe 30 and a pipe 32 connect resin tank 28 to control valve 24. A brine tank 34 holds a quantity of a regenerant salt 36, typically NaCl or KCl, and is connected to an aspirator valve 38 by a pipe 40. Pipe 40 includes a brine valve 42. Pipes 44 and 46 connect aspirator valve 38 to control valve 24. Control valve 24 may be configured to interconnect pipes 12, 16, 20, 30, 32, 44, and 46 in a number of different ways hereinafter described.

Figure 3:
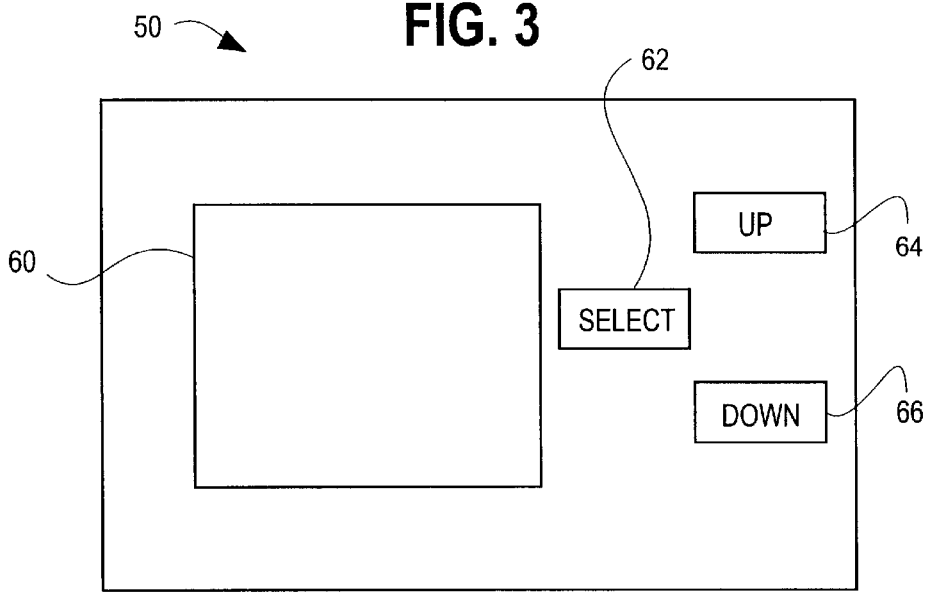
FIG. 3 is a schematic representation of a user interface for the water softener in accordance with the present invention.

Water softener 10 preferably includes a micro computer controller 48 having a user interface 50. User interface 50, shown schematically in FIG. 3, preferably includes an LCD display 60, and various buttons, such as a "SELECT" button 62, an "UP" button 64, and a "DOWN" button 66, to allow the user to selectively view and enter in information. A timer 52 is provided to enable controller 48 to measure time durations. A water meter 54 is placed in either pipe 30 or pipe 32 to enable controller 48 to measure the amount of water flowing through resin tank 28. A temperature sensor 56 is preferably disposed in brine tank 34 to enable controller 48 to measure the temperature therein. Temperature sensor 56 is preferably a thermocouple or a semiconductor device. Controller 48 sets the configuration of control valve 24.

When in service, hard water from source 14 passes through supply pipe 12 to control valve 24, which is configured so that the hard water then flows through pipe 30 to resin tank 28. In resin tank 28 the hard water passes through resin bed 26, where it is softened by an ion exchange process. The soft water flows out from resin tank 28 through pipe 32 to control valve 24. Control valve 24 is configured to direct the soft water from pipe 32 to pipe 16, where it is directed to its destination 18.

When the resin bed 26 loses its capacity to effectively soften the water passing through it, regeneration is necessary. The regeneration cycle preferably includes the following steps: (1) fill; (2) brine draw; (3) slow rinse; (4) backwash; and (5) fast rinse. During the fill step, a quantity of water flows into brine tank 34 to dissolve a quantity of the salt 36 therein in order to make the amount of brine necessary for regeneration. Specifically, control valve 24 is configured so that hard water from source 14 flows through pipe 12 to pipe 30 to resin tank 28. The hard water passes through resin bed 26 and flows out through pipe 32 to control valve 24. Control valve 24 is configured to direct this water to pipe 44 and then to pipe 40 through aspirator valve 38. Brine valve 42 opens in response to the flow of water in pipe 40, allowing the water to enter brine tank 34. The water filling brine tank 34 dissolves a quantity of the salt 36 to form a brine. Temperature sensor 56 preferably measures the temperatures of the water and of the resulting brine. The duration of the fill step determines the amount of water that enters brine tank 34 and therefore the amount of regenerant salt dissolved and available for regeneration.

During the brine draw step, control valve 24 is configured so that hard water from pipe 12 is directed to pipe 44, whereupon it flows through aspirator valve 38 to pipe 46. This flow through aspirator valve 38 creates suction on pipe 40 by the Venturi effect. Brine valve 42 is open, so that the suction on pipe 40 draws the brine in brine tank 34 formed during the fill step, up into pipe 40, which then flows through aspirator valve 38 to pipe 46. Control valve 24 is configured so that the water and brine from pipe 46 are directed through pipe 30 to resin tank 28. The brine entering resin tank 28 flows through resin bed 26, thereby regenerating it, and flows out through pipe 32 as waste. The waste is directed to drain 22 via pipe 20 for its disposal. The duration of the brine draw step is sufficiently long so as to withdraw all or nearly all of the brine from brine tank 34. Preferably, brine valve 42 closes automatically when the level of brine in brine tank 34 falls below a prescribed point.

During the slow rinse step, brine valve 42 is closed, and brine is no longer withdrawn from brine tank 34. However, water keeps flowing as in the brine draw step. In particular, the configuration of control valve 24 is the same as for the brine draw step. The remaining brine continues to flow through resin bed 26 until replaced with incoming water in order to achieve maximum ion exchange and to continue to flush out any hardness minerals or brine which may remain in resin tank 28.

During the backwash and fast rinse steps, control valve 24 is configured so that hard water from pipe 12 is directed so that the water flows through the resin bed and is directed to drain 22 via pipe 20. During the backwash step, the water flows up through resin bed 26, lifting up and expanding the resin bed 26 and flushing out iron minerals, dirt, sediments, hardness minerals, and any remaining brine. During the fast rinse step, a fast flow of water is directed downward through resin bed 26 to pack it and prepare it for service.

Controller 48 determines when to regenerate resin bed 26 and to what capacity. Various methods may be used for these determinations, such as those described in U.S. Pat. Nos. 5,544,072 and 4,722,797. The necessary capacity will, in general, depend on the hardness of the water to be treated. User interface 50 therefore preferably includes means by which the user can enter the water hardness, expressed in grains per gallon, into controller 48. To accommodate the use of different types of regenerant salt, user interface 50 also enables the user to specify the type of salt used, e.g., whether NaCl or KCl is used.

Preferably, the user-adjustable parameters, which typically include the time of day for regeneration, the water hardness, and the type of regenerant salt used, are shown as various "screens" on display 60, with each parameter having its own screen. At each screen, the user is able to scroll up and down through the available values for the parameter by pressing "UP" button 64 and "DOWN" button 66, respectively. The user indicates the desired value for the parameter by pressing "SELECT" button 62, whereupon the value is stored by computer controller 48 and the next "screen" is shown on display 60. In this way, the user is able to scroll through the available salt types, such as NaCl and KCl, and to make a selection. Other means for indicating the regenerant salt type, such as other types of computer interfaces or mechanical switches, could also be used.

From the desired capacity to which resin bed 26 is to be regenerated, the required salt dose may be determined from empirical data as described above. The salt dosages, D, for each desired regenerated capacity, C, are programmed into controller 48 for the various salt types intended to be used, such as NaCl and KCl. Thus, from the type of salt used and the regenerated capacity required, controller 48 is able to determine the salt dosage, D, needed for regeneration.

The value of D, the salt dosage, determines the amount of water that must be supplied to brine tank 34 during the fill step, based on the solubility of that salt. Preferably, the amount of water added during the fill step is determined by the fill time, the flow rate being a fixed quantity. The required fill time may thus be calculated as follows:

$$F = D/(R \times S)$$

where F=fill time in minutes, D=the salt dosage in pounds, R=the fill rate in gallons per minute, and S=the solubility of the salt in pounds per gallon. When KCl is used as the regenerant salt, however, an added complication arises in that its solubility is markedly temperature dependent over the typical range of water temperatures encountered, namely, 34° F. to 80° F., whereas the solubility of NaCl is relatively constant over this range. In particular, the solubilities of NaCl and KCl are both approximately 2.99 lbs./gal. at 80° F. At lower temperatures, the solubility of KCl is significantly less than that of NaCl as summarized in Table 1. The information in Table 1 has been generated from empirical data linearized in the range of 34° F. to 80° F., with the solubility of NaCl taken to be a constant 2.99 lbs./gal. The data of Table 1 is representative only, in that results can be affected by the water chemistry in the particular application.

TABLE 1

| Temp. (° F.) | KCl Solubility (lbs./gal.) | KCl/NaCl Difference (%) |
|---|---|---|
| 34 | 2.35 | 27.2% |
| 36 | 2.38 | 25.7% |
| 38 | 2.40 | 24.2% |
| 40 | 2.43 | 22.8% |

TABLE 1-continued

| Temp. (° F.) | KCl Solubility (lbs./gal.) | KCl/NaCl Difference (%) |
|---|---|---|
| 42 | 2.46 | 21.4% |
| 44 | 2.49 | 20.1% |
| 46 | 2.51 | 18.8% |
| 48 | 2.54 | 17.5% |
| 50 | 2.57 | 16.2% |
| 52 | 2.60 | 14.9% |
| 54 | 2.63 | 13.7% |
| 56 | 2.65 | 12.5% |
| 58 | 2.68 | 11.4% |
| 60 | 2.71 | 10.2% |
| 62 | 2.74 | 9.1% |
| 64 | 2.76 | 8.0% |
| 66 | 2.79 | 6.9% |
| 68 | 2.82 | 5.9% |
| 70 | 2.85 | 4.9% |
| 72 | 2.88 | 3.8% |
| 74 | 2.90 | 2.8% |
| 76 | 2.93 | 1.9% |
| 78 | 2.96 | 0.9% |
| 80 | 2.99 | 0.0% |

To accommodate the use of KCl, the fill times should be adjusted on the basis of water temperature to reflect the temperature dependent solubility of KCl. The simplest approach to account for this effect is not to measure the actual water temperature at all but to simply assume a typical water temperature and to increase accordingly the fill time for KCl by a fixed percentage relative to the fill time that would be required if NaCl were used. An increase in the fill time of 25% is found to be a reasonably adequate approximation for the most typical water temperatures encountered.

A more accurate system includes temperature sensor 56 in order to enable controller 48 to determine the temperature of the water being supplied to brine tank 34. Temperature sensor 56 is preferably located in brine tank 34 but may alternatively be located upstream, such as in source pipe 14. Controller 48 is programmed with the solubilities of KCl at various water temperatures, so that when KCl is used as the regenerant salt controller 48 measures the water temperature and sets the required fill time accordingly.

Alternatively, the water temperature may be a user-adjustable parameter entered into computer controller 48 by means of user interface 50 as previously described.

The temperature of the brine formed in brine tank 34 does not remain constant during the course of the fill. An example of how the brine temperature changes during the course of a fill when KCl is used as the regenerant salt is shown in tabular form in Table 2. This temperature changed is caused by two factors. First, before the fill begins, the temperatures of the water and of brine tank 34 with dry regenerant salt 36 present within will not in general be equal, so that the brine temperature will naturally equilibrate during the course of the fill. Second, the dissolution process of the salt also changes the temperature of the brine. In particular, the dissolution of KCl is significantly endothermic, so that the dissolution process itself cools the brine.

The temperature change of the brine during the course of the fill thus presents an added difficulty in the case of KCl because of its temperature dependent solubility. Temperature sensor 56 should thus measure the temperature during the course of the fill, preferably at regular intervals such as every minute. Typical results under this method are tabulated in Table 2.

TABLE 2

| Fill Time (Min) | Sample Temp (° F.) | Solubility (lbs/gal) | Required Fill Water (gal) | Required Fill Time (min) |
|---|---|---|---|---|
| 0 | 60 | 2.7048 | 2.219 | 7.40 |
| 1 | 56 | 2.6492 | 2.265 | 7.55 |
| 2 | 52 | 2.5937 | 2.3133 | 7.71 |
| 3 | 48 | 2.5381 | 2.3640 | 7.88 |
| 4 | 46 | 2.5103 | 2.3902 | 7.97 |
| 5 | 44 | 2.4826 | 2.4168 | 8.06 |
| 6 | 42 | 2.4548 | 2.4442 | 8.15 |
| 7 | 41 | 2.4409 | 2.4581 | 8.19 |
| 8 | 40 | 2.4270 | 2.4722 | 8.24 |
| 8.24 | — | END OF | FILL | — |

The preferred method of using KCl as the regenerant is described as follows. At regular time intervals during the fill, the temperature at temperature sensor 56 is measured. From this temperature, the solubility of the salt is calculated, and from this value the required volume of fill water and ultimately the required fill time may be calculated, as shown in Table 2. The fill then proceeds until the required fill time is approximately equal to the actual fill time.

Even after the fill ends, the brine temperature is often observed to continue to drop when KCl is used. This may be due to the dissolution rate of KCl which is less than that of NaCl. In other words, the KCl continues to dissolve even after the flow of water stops, thereby cooling the brine even further. The temperature drop is observed to be fairly small—typically 2° F. The temperature drop reduces the solubility of KCl even further, so that less dissolved KCl is present in the brine as result. The way to compensate for this effect is to add more water during the fill step by increasing the fill time. Typically, a 1% increase in the fill time is all that is required.

When the fill time is adjusted, the brine draw time must also be adjusted to ensure that the required amount of brine is withdrawn from brine tank 34. Typically, the ratio of the brine draw time to the fill time is a fixed quantity, so that the brine draw time may be taken to be the fill time multiplied by this quantity. The slow rinse time is typically fixed. Preferably, controller 48 calculates the necessary brine draw time based on the fill time actually used. The total "brine time" is then the sum of this necessary brine time and the slow rinse time. Controller 48 maintains control valve 24 in the brine draw/slow rinse configuration for this "brine time" to ensure that the required amount of brine is withdrawn. In the case where the fill time for KCl is increased by 25% relative to NaCl, a corresponding increase in the "brine time" for KCl of approximately 12.5% relative to NaCl is found to be sufficient.

The above described embodiments are merely illustrative of the features and advantages of the present invention. Other arrangements and advantages may be devised by those skilled in the art without departing from the spirit and scope of the present invention. Accordingly, the invention should not be deemed to be limited to the above detailed description but only by the claims that follow.

We claim:

1. In a water softener having a resin tank, a resin bed disposed in the resin tank, and a brine tank intended to contain a salt for regenerating the resin bed, the improvement comprising:
   a. a brine feed-water adjustment means for filling the brine tank with water during the regeneration cycle;
   b. a temperature sensing means for determining the temperature of the brine; and c. the temperature sensing means being coupled with the brine feed-water adjustment means, and the adjustment means adjusts the quantity of water fed into the brine tank in accordance with the temperature sensed by the temperature sensing means.

2. The water softener improvement of claim 1 wherein the temperature sensing means is located in the brine tank.

3. The water softener improvement of claim 1 wherein the brine feed-water adjustment means adjusts the quantity of water to be substantially equal to the quotient resulting from the quantity of salt desired for regeneration of the resin bed divided by the solubility of the salt at the temperature of the brine.

4. The water softener improvement of claim 1 wherein the temperature sensing means is located on a water source pipe which provides water to the brine feed-water adjustment means.

5. A water softener, comprising:
   a. a resin tank;
   b. a resin bed disposed in said resin tank;
   c. a brine tank for holding a quantity of regenerative salt and for preparing a salt solution for regenerating the resin bed;
   d. a piping system connecting said brine tank to said resin tank;
   e. salt selection means for indicating a regenerative salt type from a plurality of salt types;
   f. water dispensing means for measuring and placing either a first quantity of water in the brine tank when a first salt type is selected or a second quantity of water in the brine tank when a second salt type is selected, said second quantity of water being greater than the first quantity of water; said water interacting with a salt in the brine tank to form a brine;
   g. means for connecting said brine tank to a source of water;
   h. brine draw means for withdrawing brine from the brine tank and running the brine to the resin tank and through the resin bed, whereby the resin bed is washed with a first quantity of brine having a volume substantially equal to the first quantity of water if the first salt type is selected and a second quantity of brine having a volume substantially equal to the second quantity of water if the second salt type if selected; and
   i. a temperature sensing means for determining the temperature of the brine in the brine tank.

6. The water softener of claim 5 wherein the temperature sensing means is located in the brine tank.

7. The water softener of claim 5 wherein the temperature sensing means is on a source water pipe providing water to the water dispensing means.

8. The water softener of claim 5 wherein the temperature sensing means is a sensor in the brine tank and which measures the temperature of the brine, the sensor being connected to the water dispensing means, whereby the water dispensing means adjusts the quantity of water placed in the brine tank in accordance with both the salt type selected and the temperature sensed by the sensor.

\* \* \* \* \*